United States Patent [19]

Kallenborn

[11] 4,039,718
[45] Aug. 2, 1977

[54] HOLLOW GLASS FILAMENTS SEALED AT BOTH ENDS THEIR PRODUCTION AND THEIR USE AS MATRIX REINFORCING MATERIALS

[75] Inventor: John Kallenborn, Murrysville, Pa.

[73] Assignee: PPG Industries, Inc., Pittsburgh, Pa.

[21] Appl. No.: 642,527

[22] Filed: Dec. 19, 1975

[51] Int. Cl.$^2$ .................. B32B 3/18; B32B 17/04; C03B 23/10; C03B 23/12; C03B 37/00
[52] U.S. Cl. .......................................... 428/398; 65/2; 260/37 R; 260/37 EP; 260/38; 260/40 R; 260/42.18; 428/317; 428/359; 428/376; 428/401
[58] Field of Search ............... 428/398, 359, 376, 401, 428/317; 65/2, 3 R

[56]   References Cited
U.S. PATENT DOCUMENTS

| | | | |
|---|---|---|---|
| 3,268,313 | 8/1966 | Burgman et al. | 65/2 |
| 3,421,873 | 1/1969 | Burgman et al. | 428/398 |
| 3,510,393 | 5/1970 | Burgman et al. | 65/3 R |
| 3,542,618 | 4/1970 | DeVaughn | 428/398 |
| 3,684,474 | 8/1972 | Chisholm | 65/105 |
| 3,869,268 | 3/1975 | Briar et al. | 65/2 |
| 3,887,750 | 6/1976 | Duckett et al. | 428/398 |

Primary Examiner—J.C. Cannon
Attorney, Agent, or Firm—John E. Curley

[57]   ABSTRACT

Novel glass fiber strands of relatively short lengths are disclosed in which the strands are formed of a consolidated bundle of glass filaments. The filaments making up the consolidated strand have external diameters of 0.0003 to 0.003 inch (0.0016 to 0.076 millimeters) and 10 to 65 percent of their volume is hollow. The filaments are further sealed at each of their ends in the short lengths of consolidated strand.

2 Claims, 5 Drawing Figures

HOLLOW GLASS FILAMENTS SEALED AT BOTH ENDS THEIR PRODUCTION AND THEIR USE AS MATRIX REINFORCING MATERIALS

BACKGROUND OF THE INVENTION

Chopped fiber glass strand is commonly formed by mechanically chopping a continuous glass fiber strand either from a forming package or directly as the strand is attenuated from a bushing. A typical process for chopping fiber glass strand wet in a forming operation is the process described in U.S. Pat. No. 3,869,268 assigned to the assignee of the present invention. In this process glass fibers are attenuated, treated with a binder or size and after being gathered into a strand, the strand is pulled between a roller having a rubber surface and a second roller having a plurality of cutting blades therein. The glass strand is then chopped between the two rollers as the filaments are being attenuated.

In another process for producing chopped strand the strands are fed to a chopping operation from a forming package. In this process the strand is in dry form. A typical operation of this latter type is shown in K. L. Lowehstein, *The Manufacturing Technology of Continuous Glass Fibers*, Elsevier Scientific Publishing Company (New York: 1973), Pages 266–267.

In U.S. Pat. No. 3,510,393 a continuous glass strand is disclosed which is unique in that it is composed of a multiplicity of glass filaments which have hollow configurations. The continuous strands formed and described in this patent have external diameters of 0.0003 to 0.003 inch (0.0076 to 0.076 millimeters) and 10 to 65 percent of their volume is hollow. These continuous strands because of their hollow configurations possess excellent dielectric properties and find utility in filament winding with various resins to form rocket motor cases, radar domes and the like. Unfortunately because of their hollow configuration and the nature of prior art processes for cutting glass fibers, the hollow fiber strands are used only in a continuous strand form. If these strands were cut by normal procedures, the hollow ends of the severed strand are kept exposed to the environment, thus rendering them unsuitable for reinforcing resin matrices where it is desired to take advantage of their highly specialized dielectric properties.

THE PRESENT INVENTION

The novel strand of this invention is so constructed that finite lengths of strand are formed with the hollow filaments on each end of a finite strand formed of such filaments being sealed from the surrounding environment. Thus, the strands of this invention can be used to reinforce a resin matrix without the necessity of filament winding continuous hollow strands and still permit the fabricator to manufacture parts which will have good dielectric properties.

In accordance with this invention, glass fiber strand segments are provided which strands contain a multiplicity of hollow glass fiber filaments. The glass fiber filaments making up each strand have external diameters of 0.0003 to 0.003 inch (0.0076 to 0.076 millimeter) and each filament is characterized typically by having 10 to 65 percent of its volume hollow. The strand segments are usually of lengths of between 1/16 to 4 inches (1.58 to 101.6 millimeters), preferably ⅛ to ½ inch (3.175 to 12.7 millimeters). Strand segments longer or shorter than these typical lengths are also contemplated. The strand segments are further characterized by the fact that the hollow filaments in each strand segment are sealed at each end of the strand segment to provide a glass barrier between the hollow interior of the filaments making up the strand segment and the environment surrounding the filaments.

The strand segments of the instant invention may be provided by recourse to a special cutting process which is described and claimed in my application Ser. No. 642,526 filed concurrently with this application. That process used to provide the novel product claimed herein will be described herein with reference to the accompanying drawings in which:

DETAILED DESCRIPTION OF THE DRAWINGS

Figure 1:
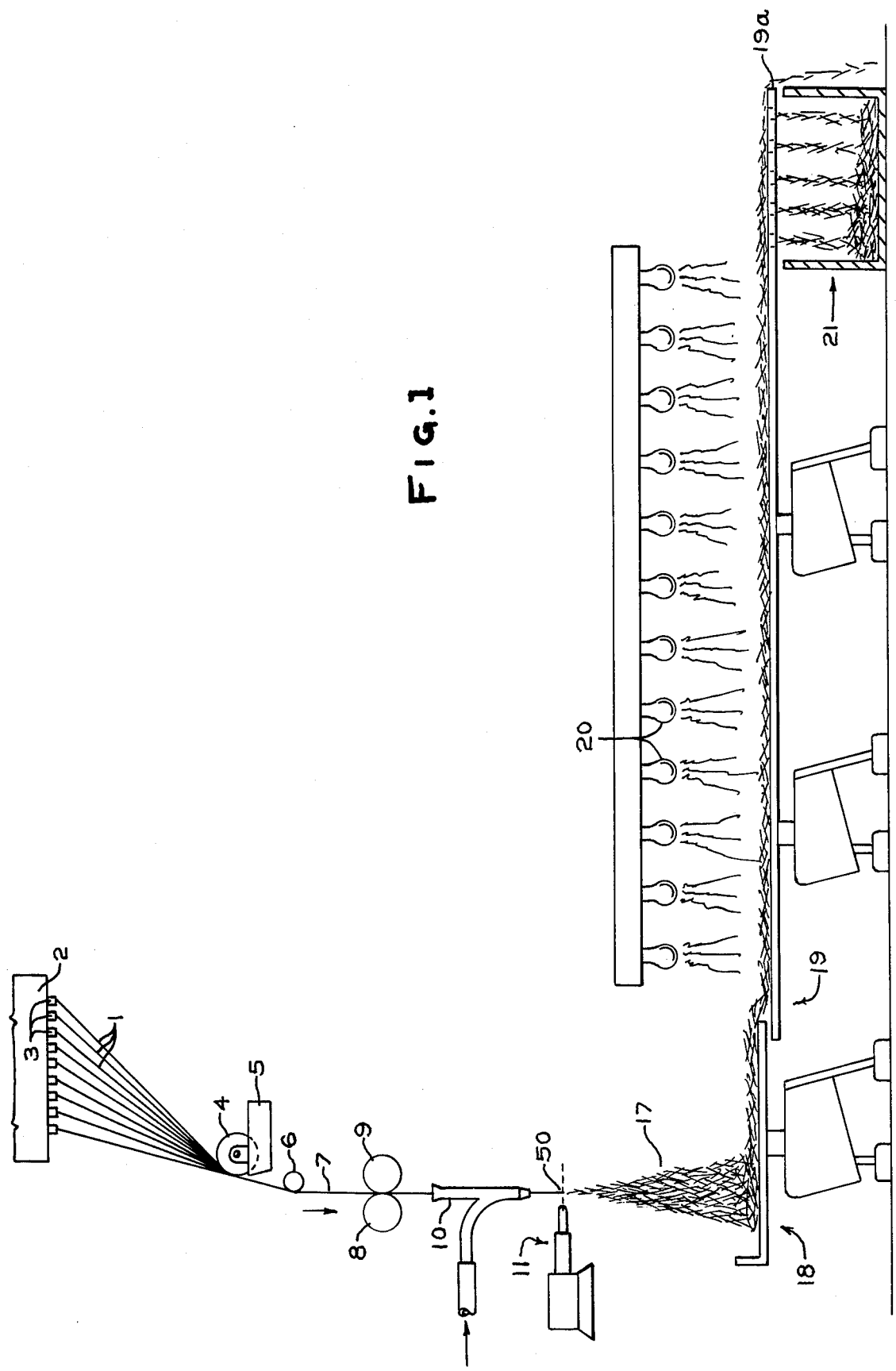
FIG. 1 is a diagrammatic illustration of a method of forming novel glass strand segments of the instant invention by cutting the continuous strands as they are formed.

Referring now to FIG. 1, glass filaments 1 are attenuated through tips or orifices 3 in a bushing 2. The bushing used and the method of glass filament formation are those described in U.S. Pat. No. 3,268,313, incorporated herein by reference. The filaments produced are hollow and are preferably passed over an applicator 4 connected to a supply of lubricant binder and/or size 5 and are coated with the lubricant or size. The filaments are gathered into a unified strand 7 by a gathering shoe 6. Alternatively, prior to forming the filaments into a unified strand 7, the glass filaments may be sprayed with water and the lubricant coating step omitted. The unified strand 7 is pulled by a pair of journaled rollers 8 and 9, one being power driven and the other in frictional engagement with the power driven one. These rollers produce the attenuation forces necessary to form the glass filaments 1. The strand 7 is passed through an air venturi 10. This venturi blows air and the strand across an interruptable laser beam apparatus 11. This apparatus is generally illustrated in FIG. 1 and is shown in greater detail in FIG. 2. The interrupted beam 50 melts the glass strand 7 regularly thus forming a plurality of short lengths of glass strand 17. At the same time the melting of the glass seals the hollow filaments making up the strand to isolate the interior of the filaments from the environment surrounding the short lengths of glass strand 17. By varying the rate of interruption of the laser beam 50, the rate of passing the glass strand across the laser beam, or a combination of these variations, lengths of glass strand of varying sizes can be formed. Lengths of from about 1/16 inch to 4 inches (1.58 to 101.6 millimeters) or longer can be formed in this manner. In the preferred embodiment, the cut glass strands 17 pass to a two-stage vibrating conveyor. The first stage 18 is vibrated at a higher amplitude than the second stage 19. Above the second stage 19 is located an infrared heated apparatus 20 which dries the cut glass strands prior to their collection. At the end of the second conveyor 19 there is a foraminous area 19a which allows properly sized fibers to fall into package 21 while oversized cut strand is discarded. The operation of the drying and collecting means is more fully disclosed in U.S. Pat. No. 3,869,268, which is incorporated herein by reference.

Alternatively, and especially when the glass filaments 1 are sprayed with water and the lubricant omitted, the cut strand 17 can be immediately collected as it passes from the laser beam 11 and packaged as a wet cut strand.

Figure 2:
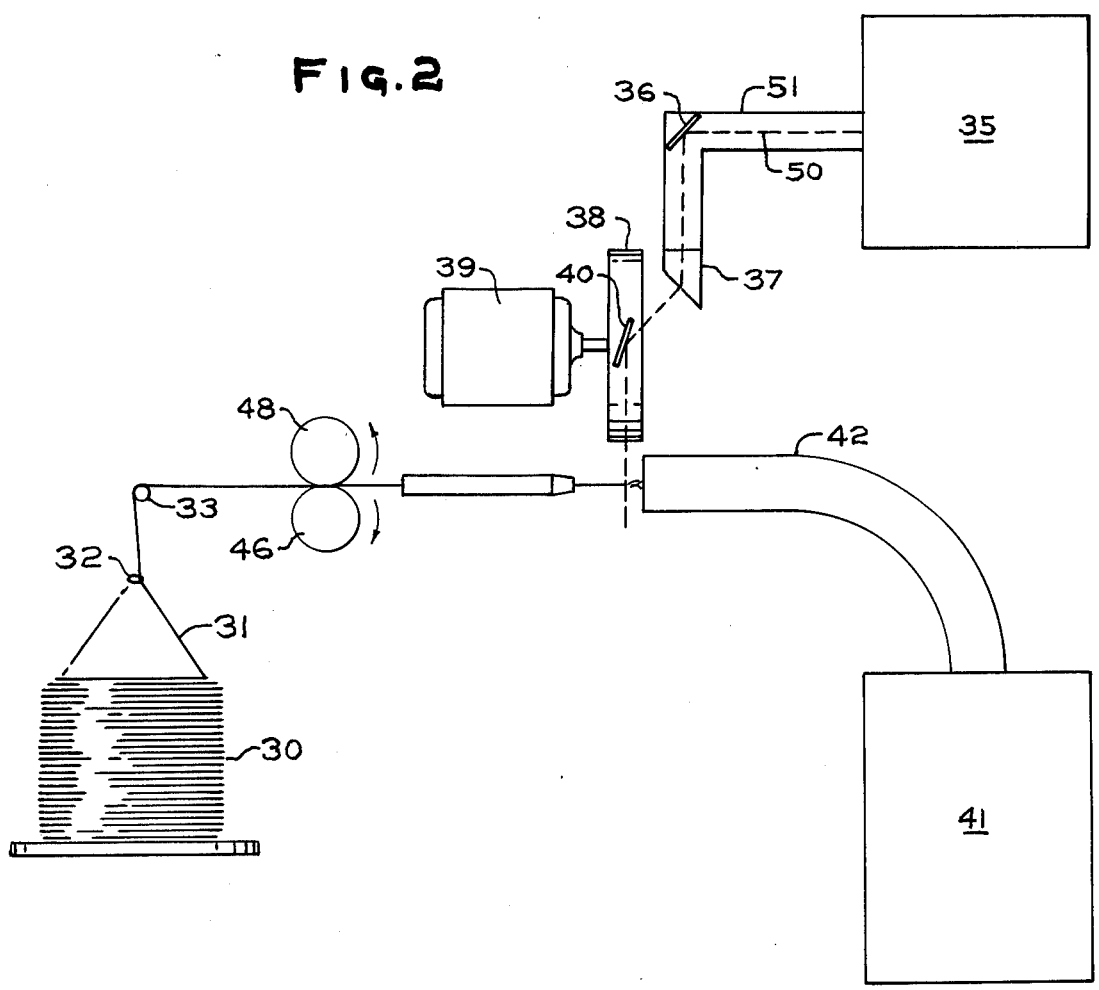
FIG. 2 is a diagrammatic illustration of preparing the novel glass strand segments of the instant invention from a forming package feed.
Figure 3:
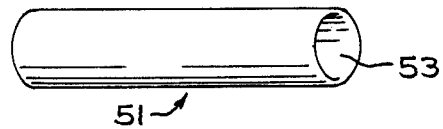
FIG. 3 is a diagrammatic illustration of one hollow filament mechanically cut to show its interior.

In FIG. 2 a forming package 30 is illustrated as a source of glass fiber strand 31. The strand 31, which is comprised of a consolidated bundle of hollow filaments, passes through guides 32 and 33 between pull rolls 46 and 48 and through tube guide 34. The strand is pulled through the tube guide 34 by the vacuum forces produced by vacuum-tank 41. As the strand exits the tube guide 34 it crosses the interrupted laser beam 50. The beam 50 is formed by generator 35. It passes from the generator in a straight line and is reflected by mirror 36 to a 45° lens 37. The beam 50 passes through the lens 37 and onto rotating interrupter 38 which is driven by motor 39. As the interrupter 38 rotates, the beam 50 will line up with mirror 40 regularly. At those points, the beam 50 passes across the path of the glass fiber strand 31 and melts the strand into individual lengths. The hollow filaments in the individual lengths are each sealed at each end thereof. While in this embodiment a continuous beam 50 is employed with an interrupter 38 such that the glass strand 31 is cut by a pulsed beam, it is equally feasible to form the pulsating beam from a pulsating generator, eliminating the need for the interrupter 38. Due to the vacuum forces of tank 41, the cut glass strands are pulled through line 42 into a collection area in the vacuum tank 41.

Figure 4:
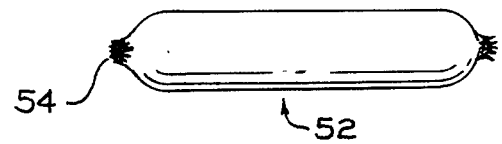
FIG. 4 is a diagrammatic illustration of one filament, typifying each of the filaments present in a strand segment of the instant invention.

The filaments in the strand segments prepared by these methods are typified in FIG. 4 where the filament 52 is shown sealed at each end 54. The sealing is accomplished by the melting of the strand passing the laser and seals each filament in the strand. This contrasts sharply with the open end 53 of hollow filament 51 cut by ordinary processing techniques.

Figure 5:
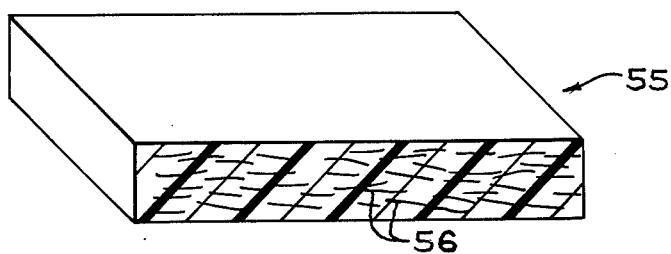
FIG. 5 is a diagrammatic illustration of a resin matrix reinforced with the glass strand segments of the instant invention.

A segmented strand 56 comprising a consolidated bundle of filaments having the sealed ends 54 shown in FIG. 4 may be used in making resin composites 55 such as depicted in FIG. 5. In this figure the hollow filament containing strand segments 56 are dispersed in a resin matrix and since the strands 56 are comprised of filaments 52, i. e., sealed at ends 54, they retain the hollow state since resin cannot enter the glass filaments 52 and thus provide both reinforcement and excellent dielectric properties.

The hollow glass filament containing segmented strands can be used to reinforce polyester resins, epoxy resins, phenolic resins and other conventional resin products which may be reinforced by glass fibers having a suitable binder thereon. Use of the novel strand segments in these resins make it possible to enhance the dielectric properties of such materials.

While the invention has been described with reference to certain specific illustrated embodiments, it is not intended to be limited thereby except insofar as appears in the accompanying claims.

I claim:

1. An article of manufacture comprising a strand of finite length formed of a consolidated bundle of glass filaments, each of the filaments in said bundle having an external diameter of 0.0003 to 0.003 inch (0.0076 to 0.076 millimeter) and having 10 to 65 percent of its volume hollow, said glass filaments in the strand being of lengths of 1/16 to 4 inches (1.58 to 101.6 millimeters) and wherein each of the filaments in the said consolidated bundle forming said strand are sealed at each of their ends.

2. An article of manufacture comprising a strand formed of a consolidated bundle of glass filaments, each of the filaments in said consolidated bundle forming said strand having an external diameter of 0.0003 to 0.03 inch (0.0076 to 0.076 millimeter) and each filament having 10 to 65 percent of its volume hollow and wherein each of the filaments in the bundle forming said glass strand is sealed at each end thereof thereby providing a glass barrier between the hollow interior of the filaments in the bundle forming said strand and the environment.

* * * * *

UNITED STATES PATENT AND TRADEMARK OFFICE
CERTIFICATE OF CORRECTION

PATENT NO. : 4,039,718

DATED : August 2, 1977

INVENTOR(S) : John Kallenborn

It is certified that error appears in the above-identified patent and that said Letters Patent are hereby corrected as shown below:

Column 4, line 36, Claim 2 "0.03" should be ---0.003---.

Signed and Sealed this

Fifteenth Day of November 1977

[SEAL]

Attest:

RUTH C. MASON
Attesting Officer

LUTRELLE F. PARKER
Acting Commissioner of Patents and Trademarks